United States Patent [19]
Redlich

[11] Patent Number: 6,118,235
[45] Date of Patent: Sep. 12, 2000

[54] CIRCUITS FOR CONTROLLING RECIPROCATION AMPLITUDE OF A LINEAR MOTOR

[76] Inventor: Robert Walter Redlich, 9 Grand Park Blvd., Athens, Ohio 45701

[21] Appl. No.: 09/337,322

[22] Filed: Jun. 22, 1999

[51] Int. Cl.⁷ ................................................ H02K 41/00
[52] U.S. Cl. .............................................. 318/135; 310/12
[58] Field of Search ................................ 310/12, 68 D; 318/135, 687; 323/201, 333, 252

[56] References Cited

U.S. PATENT DOCUMENTS

| | | | |
|---|---|---|---|
| 5,032,772 | 7/1991 | Gully et al. | 318/135 |
| 5,729,067 | 3/1998 | Janutka | 310/135 |
| 5,751,076 | 5/1998 | Zhou | 310/12 |

*Primary Examiner*—Nestor Ramirez
*Assistant Examiner*—Judson H. Jones

[57] ABSTRACT

Circuits for converting DC voltage into controllably variable amplitude AC voltage, for the purpose of driving an oscillating linear motor with controllable amplitude, are disclosed. Unlike pulse width modulation circuits for the same purpose, the disclosed circuits do not require suppression of electromagnetic interference and have negligible switching loss.

3 Claims, 7 Drawing Sheets

FIG. 7

CIRCUITS FOR CONTROLLING RECIPROCATION AMPLITUDE OF A LINEAR MOTOR

TECHNICAL FIELD

This invention relates to an electronic circuit for generating controllably variable alternating voltage used to energize a linear motion electric motor, for the purpose of causing the motor's moving element to oscillate with controllably variable amplitude.

BACKGROUND ART

In practice, the function of a linear motion electric motor, for example the motor disclosed in U.S. Pat. No. 4,602,174, is to drive a mechanical element such as the piston of a compressor with controllably variable amplitude oscillatory motion. To accomplish this, the amplitude of the voltage applied to the motor winding must be controllably variable.

If the source of electrical power for the linear motor is constant voltage AC such as 120 VRMS, 60 hz., controllably variable voltage to energize the motor can be generated inexpensively with a triac, using, for example, the circuit disclosed in U.S. Pat. No. 5,592,073.

If the source of electrical power for the linear motor is DC, e.g. a battery or solar panel, voltage from the source must be converted to variable voltage AC to energize the motor. DC to variable voltage AC conversion has been accomplished in prior art by using pulse width modulation (PWM) technique, one example of which is disclosed in U.S. Pat. No. 5,156,005.

A PWM linear motor driver applies to the motor winding a train of rectangular voltage pulses of alternating polarity, at a repetition frequency much higher than the oscillation frequency of the motor, and with a duty cycle controllably modulated at the motor oscillation frequency so as to cause the average value of a pulse to vary with its time of occurrence. The motor responds to average value but has negligible response at the pulse repetition frequency. Therefore, by modulating pulse duty cycle at the required frequency of motor oscillation and with variable amplitude, controllably variable amplitude AC voltage can be effectively applied to the motor.

A disadvantage of a PWM motor drive is that it can be a source of serious electromagnetic interference (EMI) unless it is provided with costly shielding and filtering. EMI is generated by PWM drivers because of high speed switching needed in PWM to minimize switching losses. Typical PWM switching time is 150 nanoseconds, which can generate EMI in the radio and television bands. Since devices equipped with DC powered linear motors may be used near radios or TV sets, very effective EMI suppression is essential to such devices and adds significant cost.

The cost of a PWM motor driver is increased by its requirement for electronic switches capable of high speed switching, which are needed if switching losses are to be acceptably low. Field effect transistors (FETs) are usually used, but are relatively expensive compared to bipolar transistors, which are generally inapplicable to PWM because their relatively slow switching would cause excessive switching loss.

Accordingly, the object of the present invention is to generate, from a DC source, controllably variable voltage AC to drive a linear motor, and to do so without generating significant EMI and with the option of using either FETs or inexpensive bipolar transistors as switching elements in the invention; the choice of switching element depending on considerations of cost, efficiency, and available DC voltage.

BRIEF DISCLOSURE OF INVENTION

The invention uses an H-bridge to apply to a linear motor a train of controllably variable duration pulses whose repetition frequency is equal to the motor oscillation frequency and whose polarity alternates from positive to negative. Between pulses, all of the active elements of the H-bridge are turned off. Compared to PWM of prior art, the number of switching events per unit time in the present invention is lower by a typical factor of 250, which as two consequences that permit the achievement of the objects of the invention. First, switching can be slow, since, even though the loss per switching event is then high, the rate of switching is so low that switching loss per unit time will be lower by a typical factor of 10 than that of a PWM system, even if bipolar transistors (typical switching time about 20 times greater than a FET) are used as switching elements in the invention. Second, low switching rate and high switching time both act to reduce EMI generated by the invention to practical insignificance.

The voltage waveform applied to a linear motor driven by the invention will not be sinusoidal, but in practice this is of little consequence, since linear motor mechanical loads are almost always mechanically tuned with a spring to the mechanical oscillation frequency, and therefore have low response to applied voltage at harmonics of the oscillation frequency.

The invention may use a complementary H-Bridge, in which the high and low side switching elements in the case of a FET bridge are P-channel FETs and N channel FETs respectively, and, in a bipolar transistor bridge, PNP and NPN transistors respectively. This arrangement offers simplicity and economy since all switching signals swing between the same power supply rails. Switching logic is simple, and expensive high side drivers needed by a non-complementary H bridge are obviated.

If the available DC voltage is low (e.g. 12 Volts for automotive applications), saturation losses in a bipolar transistor embodiment of the invention will be significant, as will be the losses in an embodiment of the invention that uses complementary N and P channel FETs, since P channel FETs have much higher on resistance than N channel FETs of the same voltage rating. In these cases the invention can be embodied as an all N-channel FET H bridge using high side drivers, if improved efficiency justifies the added cost.

In summary, the invention consists of the combination of an H bridge consisting of either all FETs or all bipolar transistors, and signals that turn the elements of the bridge on and off in such a way as to apply, to a linear motor connected to the bridge output, a train of controllably variable duration pulses, of alternating polarity, at the required frequency of oscillation of the mechanical system driven by the linear motor, and with intervals between successive pulses during which all the active bridge elements are turned off.

DETAILED DESCRIPTION OF INVENTION

Figure 1:
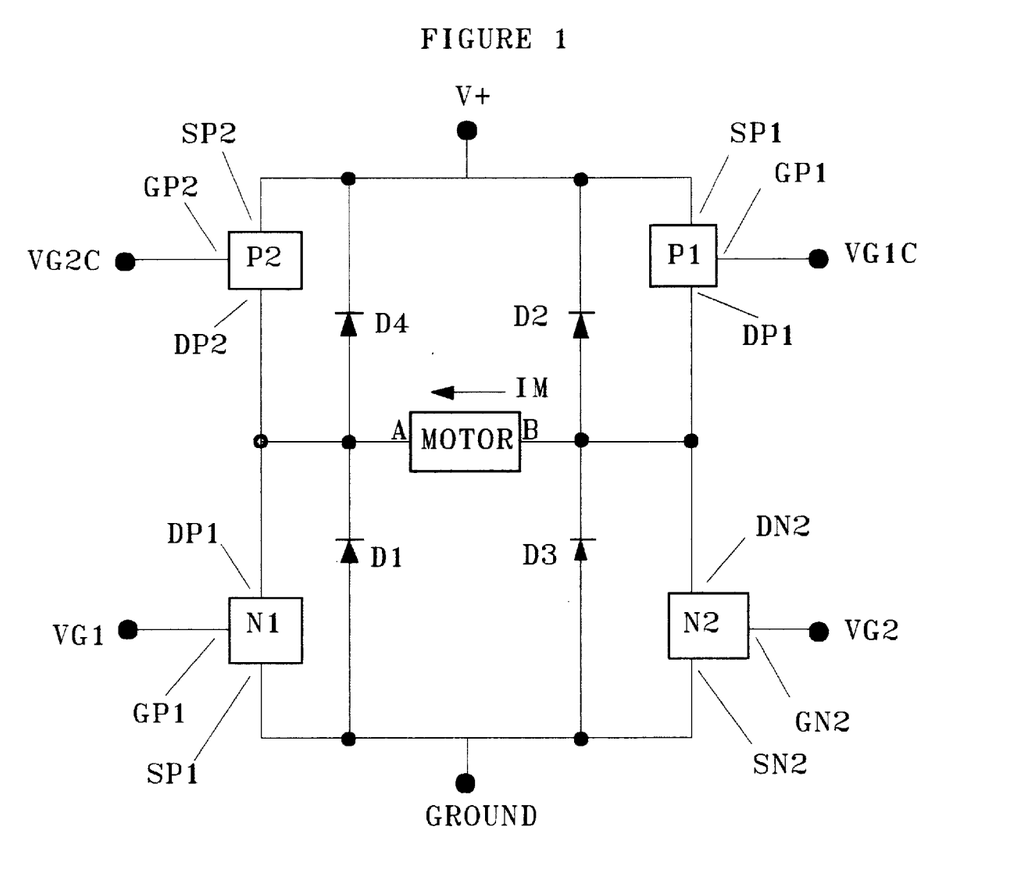
FIG. 1 illustrates a complementary H-bridge with FET switches, and identifies symbolically the switching signals and motor current.
Figure 2:
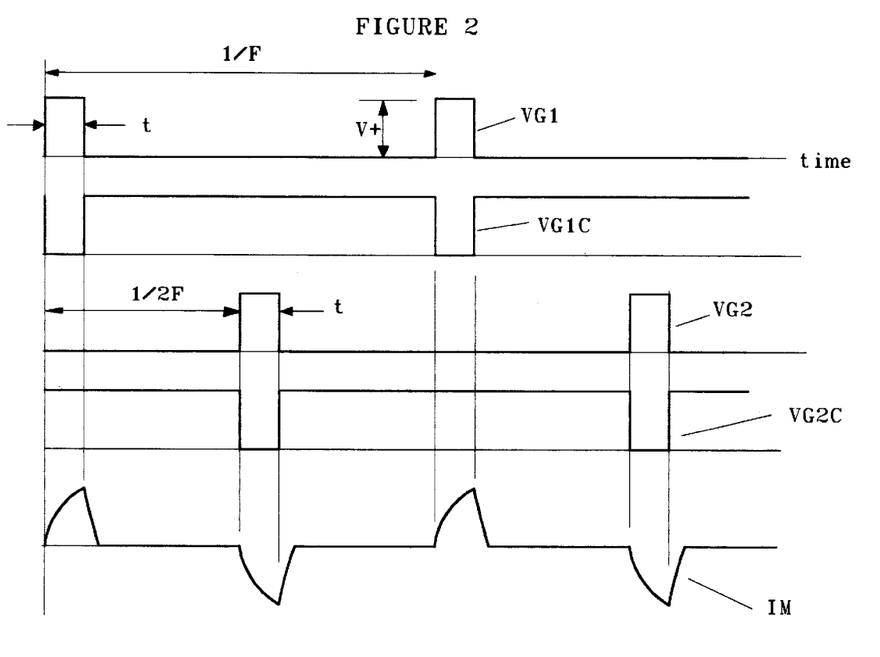
FIG. 2 shows waveforms of switching signals and motor current in the circuit of FIG. 1.

Referring to FIGS. 1 and 2, N1 and N2 are N channel FETs, P1 and P2 are P channel FETs. SN1, GN1, DN1 are respectively the source, gate and drain terminals of N1; with analogous notation identifying the source, gate, and drain terminals of N2, P1, and P2, V+ to ground is a DC voltage obtained from a source such as a battery or solar panel. The gate signals applied to GN1, GN2, GP1 and GP2 are VG1, VG2, VG1C, and VG2C respectively. VG1C is the complement of VG1 and VG2C is the complement of VG2. All gate signals swing between V+ and ground, and all repeat at frequency F, where F is the required frequency of motor oscillation. VG2 is displaced in time from VG1 by $(1/(2 F))$, but has the same pulse duration (t) as VG1.

Since a P channel FET turns on when its gate is negative relative to its source, and an N channel FET turns on when its gate is positive relative to its source, the switching elements are turned on and off in diagonal pairs, in the sequence:

a) N1 and P1 on, N2 and P2 off.
b) all off.
c) N2 and P2 on, N1 and P1 off.
d) all off.

When the pair (N1,P1) is on, a voltage approaching V+ is applied to motor terminal A, and motor terminal B is substantially at ground potential. Therefore, motor current IM builds up in the indicated direction until the pair (N1,P1) is turned off. For an interval following turn-off of (N1,P1), the inductance of the motor winding maintains non-zero IM even though all FETs are turned off. During this interval, IM flows through diodes D3 and D4 and decays to zero.

When the pair (N2,P2) is on, a voltage approaching V+ appears at motor terminal A and terminal B is substantially at ground potential. Motor current IM builds up in a direction opposite to the arrow in FIG. 1 until pair (N2,P2) is turned off, whereupon, for a short interval, motor inductance maintains a decaying IM through diodes D1 and D2.

The fundamental Fourier component of voltage applied to the motor increases monotonically from zero when t=0 to substantially $[(4/\pi) \times (V+)]$ when t=½ F. Since the only practical motor response is its response to the fundamental applied voltage, it follows that the effective voltage applied to the motor can be increased monotonically by increasing t.

Figure 3:
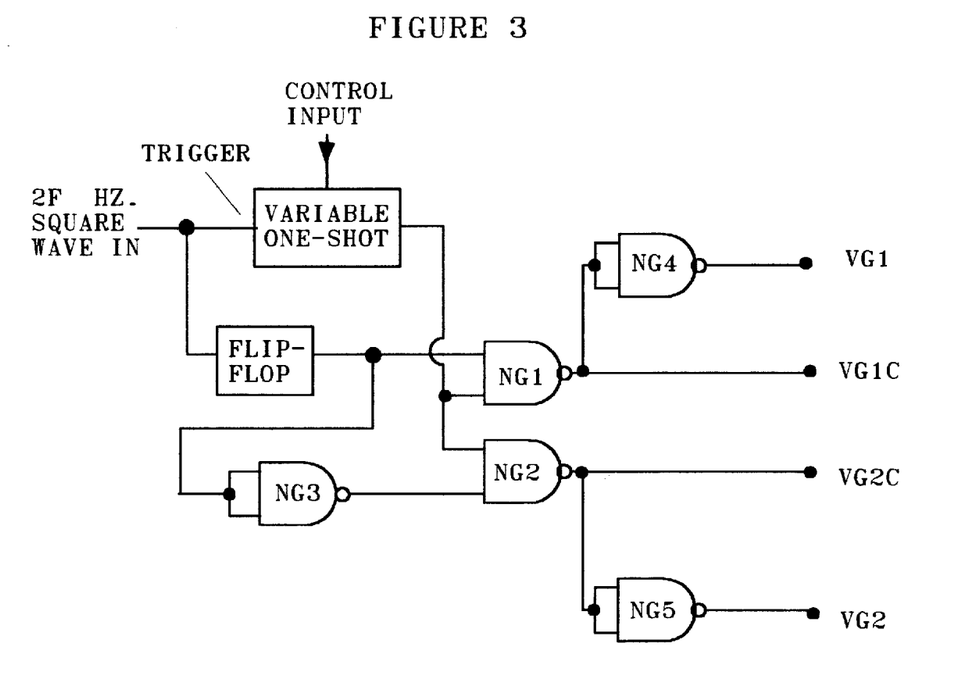
FIG. 3 shows a preferred embodiment of circuitry for generating the switching signals of FIGS. 1 and 2.

FIG. 3 shows a preferred embodiment for generating the gate voltages VG1, VG2, VG1C, VG2C. A conventionally generated square wave at frequency 2 F hertz is used, first to trigger a controllable one-shot multivibrator whose output is a train of pulses at frequency 2 F, each pulse having a duration t that is responsive to a control input voltage, and second, to trigger a flip-flop (divide by 2 circuit) whose output is a square wave of frequency F hertz. A NAND operation is performed on the one-shot and flip-flop outputs by NAND gate NG1 to generate VG1C, which is complemented by NAND gate NG4 to generate VG1. To generate VG2C, a NAND operation is performed by NAND gate NG2 on the one-shot output and the complement of the flip-flop output, which is generated by NAND gate NG3. VG2C is complemented by NAND gate NG5 to generate VG2.

Figure 4:
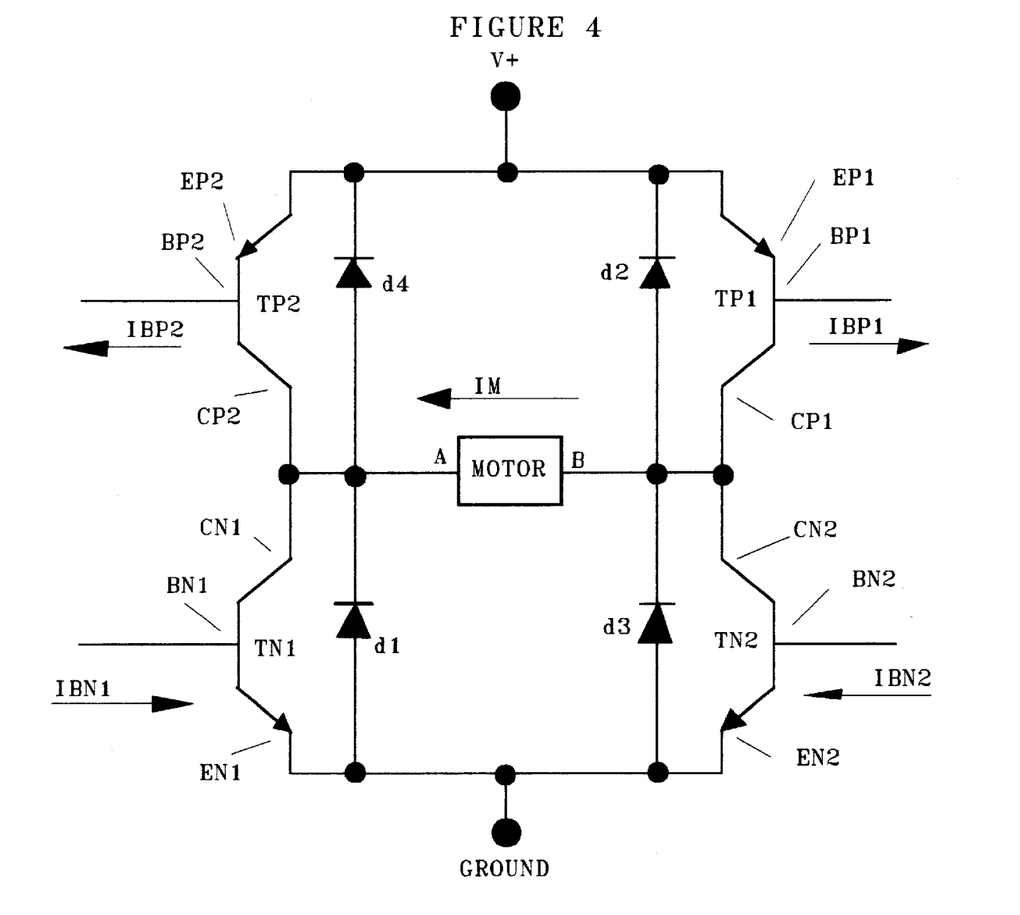
FIG. 4 illustrates a complementary H-bridge with bipolar transistor switches, and identifies symbolically the switching currents and motor current.
Figure 5:
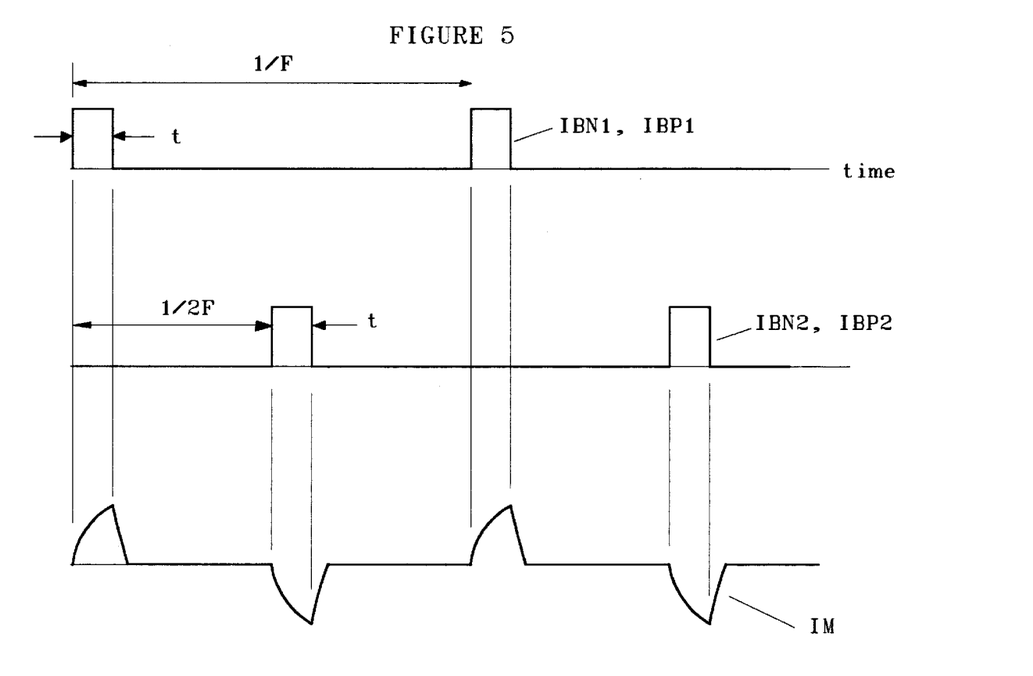
FIG. 5 shows waveforms of switching currents and motor current in the circuit of FIG. 4.

FIGS. 4 and 5 illustrate another form of the invention in which the switching elements of a complementary H-bridge are PNP and NPN bipolar transistors that are switched on and off by base currents having waveforms according to the invention. TN1, TN2 are NPN transistors and TP1, TP2 are PNP transistors. d1 through d4 are diodes. The emitter, base and collector of TN1 are designated by EN1, BN1, and CN1 respectively, with analogous designations for the terminals of TN2,TP1,TP2. V+ and ground are respectively the positive and negative terminals of a DC source such as a battery or solar panel. The base currents of TN1, TN2 TP1, TP2 are designated respectively as IBN1,IBN2,IBP1,IBP2, and their waveforms are shown in FIG. 5. All the base currents are pulses with controllably variable duration t and all repeat at the required motor oscillation frequency F. Base currents IBN1 and IBP1 have identical waveforms. The waveforms of base currents IBN2, IBP2 are also identical, and are displaced in time from that of IBN1, IBN2 by $1/(2 F)$. The magnitude of each base current is sufficient to drive its associated transistor into saturation, so that the transistors act as switches. As indicated in FIG. 4, the positive sense of base current of TN1 and TN2 is into their respective bases, while the positive sense of base current of TP1 and TP2 is out of their bases.

Since an NPN transistor is turned on by current into its base and a PNP transistor by current out of its base, the transistors in FIG. 4 are switched on in diagonal pairs in the sequence:

a) TN1 and TP1 on, TN2 and TP2 off.
b) all off.
c) TN2 and TP2 on, TN1 and TP2 off.
d) all off.

When TN1 and TP1 are turned on, motor terminal B rises to a voltage (V+−saturation voltage of TP1) and motor terminal A reaches the saturation voltage of TN1. Thus, commencing at turn-on of (TN1, TP1), motor current IM will build up in the indicated direction until TN1 and TP1 are turned off. For an interval following turn-off of (TN1,TP1), the inductance of the motor winding maintains non-zero IM even though all transistors are turned off. During this interval, IM flows through diodes d3 and d4, and decays to zero.

When the pair (TN2,TP2) is turned on, a voltage (V+ minus saturation voltage of TP2) appears at motor terminal A and terminal B is at a voltage equal to the saturation voltage of TN2. Motor current IM builds up in a direction opposite to the arrow in FIG. 1 until pair (TN2,TP2) is turned off, whereupon, for a short interval, motor inductance maintains a decaying IM through diodes d1 and d2.

Figure 6:
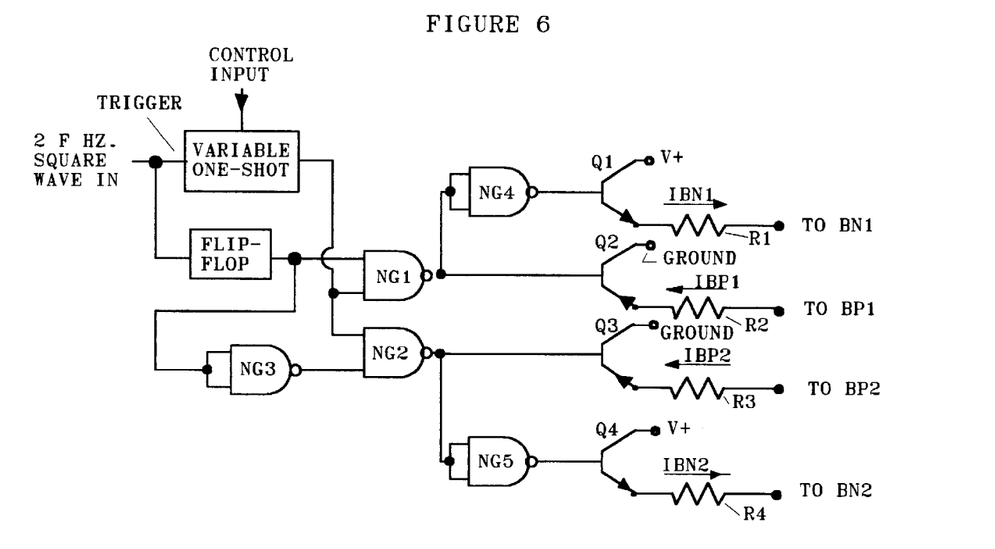
FIG. 6 shows a preferred embodiment of circuitry for generating the switching currents of FIGS. 4 and 5.

FIG. 6 shows a preferred embodiment for generating the base currents IBN1, IBN2, IBP1, IBP2. Except for emitter follower transistors Q1 through Q4 and resistors R1 through R4, FIG. 6 is identical to FIG. 3 and the voltages at the bases of Q1 through Q4 are respectively equal to VG1, VG1C, VG2C, and VG2 in FIG. 3. (Q1, R1), (Q2,R2), (Q3,R3), and (Q4,R4) comprise current sources substantially equal to VG1/R1, VG2/R2, VG3/R3, AND VG4/R4 respectively, and supply the respective base currents IBN1, IBP1, IBP2, and IBN2. The values of R1 through R4 are selected so that TN1, TN2, TP1, and TP2 are saturated when they are driven with base current. Q1 and Q4 are NPN transistors that supply current flowing into the bases of NPN transistors TN1 and TN2. Q2 and Q3 are PNP transistors that supply current flowing out of the bases of PNP transistors TP1 and TP2.

Figure 7:
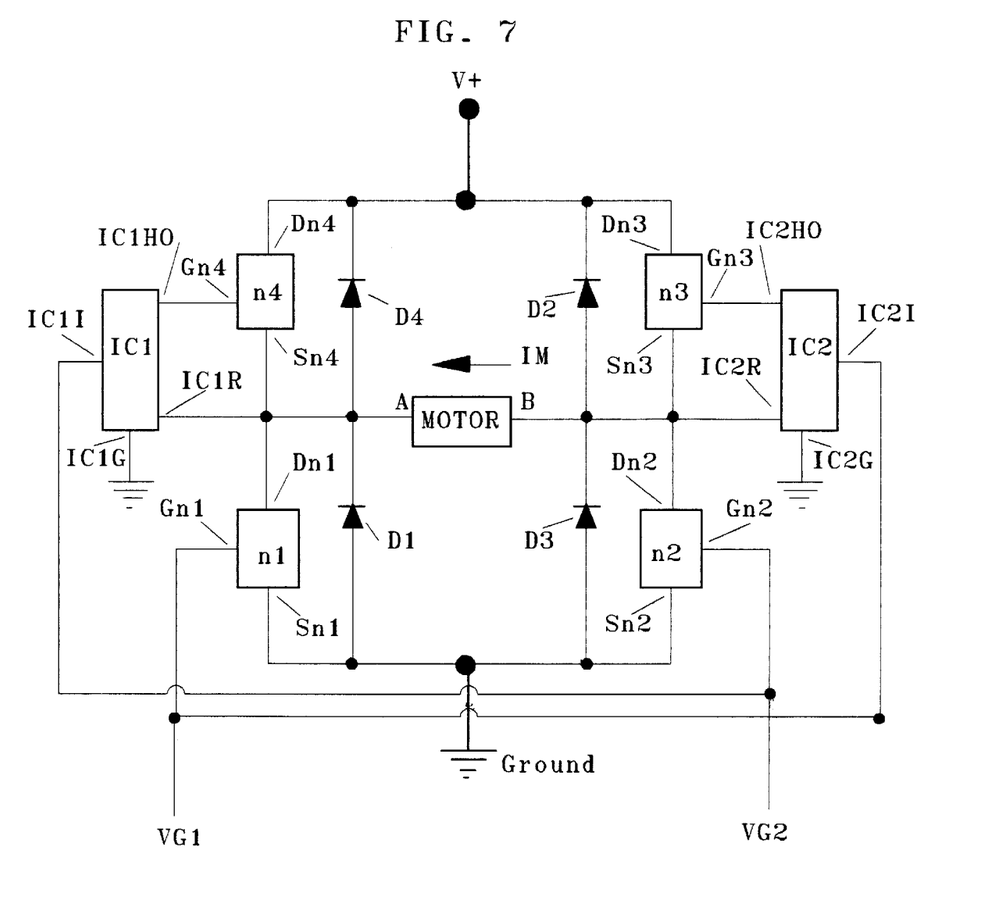
FIG. 7 shows a preferred embodiment of a non-complementary H-bridge which uses all N-channel field effect transistors, and high side drivers to achieve the goals of the invention with high efficiency.

FIG. 7 illustrates an embodiment of the invention that is preferred when the higher efficiency of an all N-channel FET H-bridge compared to a complementary H-bridge justifies the added cost of "high side drivers", which are standard integrated circuits that translate a gate drive signal referenced to ground to a "floating reference", which is a circuit node whose voltage relative to ground can vary with time. An all N-channel FET H-bridge requires high side drivers for the two FETs whose drains are connected to the positive supply voltage, because their gate signals must be referenced to their sources, each of which is at a time varying voltage relative to ground. A typical high side driver integrated circuit is designated IR2111 and is produced by International Rectifier.

Referring to FIG. 7, gate drive signals VG1 and VG2 are trains of rectangular pulses having positive polarity, controllably variable duration t, and frequency 2 F, as shown in FIG. 2. VG1 and VG2 are identical except for a relative displacement in time of 1/(2 F). VG1 is applied both to the gate of N-channel FET n1 and to the input terminal IC2I of high side driver IC2. IC2 generates a voltage, identical in waveform to VG1, between its output terminal IC2HO and is reference terminal IC2R, which are respectively connected to the gate and source terminals Gn3 and Sn3 of N-channel FET n3. Thus n1 and n3 are turned on and off simultaneously by VG1. In the same manner, n2 and n4 are turned on and off simultaneously by VG2, and the H bridge functions as previously explained with reference to FIG. 1, in order to generate a motor current IM as illustrated in FIG. 2.

I claim:

1. An electronic driver for generating oscillating, controllably variable amplitude motion of the moving element of a linear motor, the motor having a winding with first and second terminals, the motor oscillating at a frequency denoted herein by F, the driver consisting of the following combination, first and second P channel field effect transistors, referred to herein as P1 and P2, with source, gate and drain terminals referred to herein as SP1,GP1,DP1 and SP2, GP2,DP2 respectively, first and second N channel field effect transistors, referred to herein as N1 and N2, with source, gate and drain terminals referred to herein as SN1,GN1,DN1 and SN2,GN2,DN2 respectively, four diodes, referred to herein as D1 through D4, a source of DC voltage with positive and negative terminals that are referred to herein as V+ and ground respectively, a first circuit node, formed by electrically connecting together all of the following terminals; DN1, DP2, cathode of D1, anode of D4, and said first motor terminal, a second circuit node, formed by electrically connecting together all of the following terminals; DN2, DP1, cathode of D3, anode of D2, and said second motor terminal, a third circuit node, formed by electrically connecting together all of the following terminals; SP1, SP2, cathode of D2, cathode of D4, and V+, a fourth circuit node, formed by electrically connecting together all of the following terminals; SN1, SN2, anode of D1, anode of D3, and ground, a first train of rectangular voltage pulses of frequency F and controllable duration t, the first train and its complement referred to herein as VG1 and VG1C respectively, VG1 applied to GN1, VG1C applied to GP1, the high and low levels of VG1 being V+ and ground respectively, a second train of rectangular voltage pulses of frequency F and controllable duration t, the second train identical to said first pulse train except for a displacement in time relative to said first train by (½ F), the second train and its complement referred to herein as VG2 and VG2C respectively, the high and low levels of VG2 being V+ and ground respectively, VG2 applied to GN2, VG2C applied to GP2.

2. An electronic driver for generating oscillating, controllably variable amplitude motion of the moving element of a linear motor, the motor having a winding with first and second terminals, the motor oscillating at a frequency F, the driver consisting of the following combination, first and second NPN transistors, referred to herein as TN1 and TN2, with emitter, base, and collector terminals designated herein as EN1,BN1,CN1 and EN2, BN2,CN2 respectively, first and second PNP transistors, referred to herein as TP1 and TP2, with emitter, base, and collector terminals designated herein as EP1,BP1,CP1 and EP2,BP2,CP2 respectively, four diodes, designated herein as d1 through d4, a source of DC voltage with positive and negative terminals that are referred to herein as V+ and ground respectively, a first circuit node, formed by electrically connecting together all of the following terminals; CN1, CP2, cathode of d1, anode of d4, and said first terminal, a second circuit node, formed by electrically connecting together all of the following terminals; CN2, CP1, cathode of d3, anode of d2, and said second terminal, a third circuit node, formed by electrically connecting together all of the following terminals; EP1, EP2, cathode of d2, cathode of d4, and V+, a fourth circuit node, formed by electrically connecting together all of the following terminals; EN1, EN2, anode of d1, anode of d3, and ground, a first train of rectangular current pulses of frequency F and controllable duration t, the first train referred to herein as IBN1, IBN1 flowing into BN1, the high level of IBN1 being sufficient to drive TN1 into saturation, the low level of IB1 being zero, a second train of rectangular current pulses with high and low levels simultaneous with the high and low levels of IBN1, the second train referred to herein as IBP1, IBP1 flowing out of BP1, the high level of IBP1 being sufficient to drive TP1 into saturation, the low level of IBP1 being zero, a third train of rectangular current pulses of frequency F and controllable duration t, the third train referred to herein as IBN2, IBN2 displaced in time from IBN1 by (½ F) but otherwise identical to IBN1, IBN2 flowing into BN2, the high level of IBN2 being sufficient to drive TN2 into saturation, the low level of IBN2 being zero, a fourth train of rectangular current pulses with high and low levels coincident with the high and low levels of IBN2, the second train referred to herein as IBP2, IBP2 flowing out of BP2, the high level of IBP2 being sufficient to drive TP2 into saturation, the low level of IBP2 being zero.

3. An electronic driver for generating oscillating, controllably variable amplitude motion of the moving element of a linear motor, the motor having a winding with first and second terminals, the motor oscillating at a frequency denoted herein by F, the driver consisting of the following combination, first, second, third and fourth N channel field effect transistors, designated herein as n1, n2, n3, and n4, with source, gate and drain terminals designated herein as Sn1, Gn1, Dn1 through Sn4, Gn4, Dn4 respectively, four diodes, designated herein as D1 through D4, a source of DC voltage with positive and negative terminals that are referred to herein as V+ and ground respectively, a first circuit node, formed by electrically connecting together all of the following terminals; Dn1, Sn4, cathode of D1, anode of D4, and said first motor terminal, a second circuit node, formed by electrically connecting together all of the following terminals; Dn2, Sn3, cathode of D3, anode of D2, and said second motor terminal, a third circuit node, formed by electrically connecting together all of the following terminals, Dn3, Dn4, cathode of D2, cathode of D4, and V+, a fourth circuit node, formed by electrically connecting together all of the following terminals; Sn1, Sn2, anode of D1, anode of D3, and ground, a first train of positive polarity rectangular voltage pulses of frequency F and controllable duration t, the first pulse train referred to herein as VG1, the lower voltage level of the first pulse train being ground, the first pulse train being connected between Gn1 and ground, a second train of rectangular voltage pulses, the second train being identical to said first train except for a displacement in time by ½ F, the second train referred to herein as VG2, the second pulse train being connected between Gn2, and ground, a first integrated circuit high side driver designated herein by IC1; IC1 having an input terminal, a ground terminal, a high side output terminal, and a high side reference terminal designated respectively herein by IC1I, IC1G, IC1HO, IC1HR; said terminals being connected respectively to VG2, ground, Gn4, and said first circuit node, a second integrated circuit high side driver designated herein by IC2; IC2 having an input terminal, a ground terminal, a high side output terminal, and a high side reference terminal designated respectively herein by IC2I, IC2G, IC2HO, ICHR; said terminals being connected respectively to VG1, ground, Gn3, and said second circuit node.

* * * * *